A. BLACK.
RENDERING PAN.

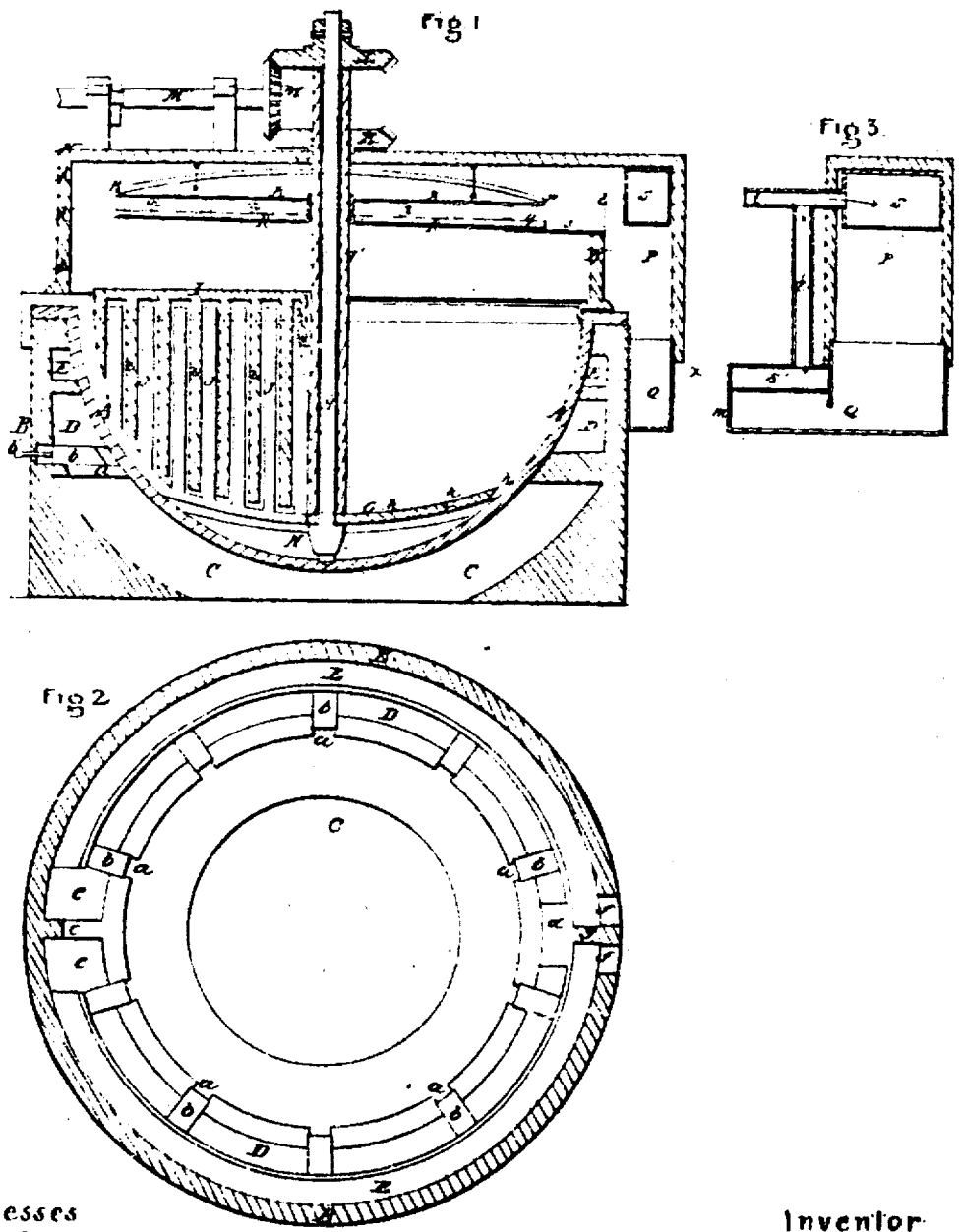

No. 47,788. Patented May 23, 1865.

Witnesses

Inventor

UNITED STATES PATENT OFFICE.

ANDREW BLACK, OF NEW YORK, N. Y.

IMPROVED RENDERING-PAN.

Specification forming part of Letters Patent No. 47,788, dated May 23, 1865.

*To all whom it may concern:*

Be it known that I, ANDREW BLACK, of East Forty-Fifth street, near First avenue, in the city, county, and State of New York, have invented certain new and useful Improvements in Pans for Melting Fatty Substances; and I do hereby declare that the following is a full, clear, and exact description of the same, reference being had to the accompanying drawings, forming part of this specification, in which—

Figure 4:
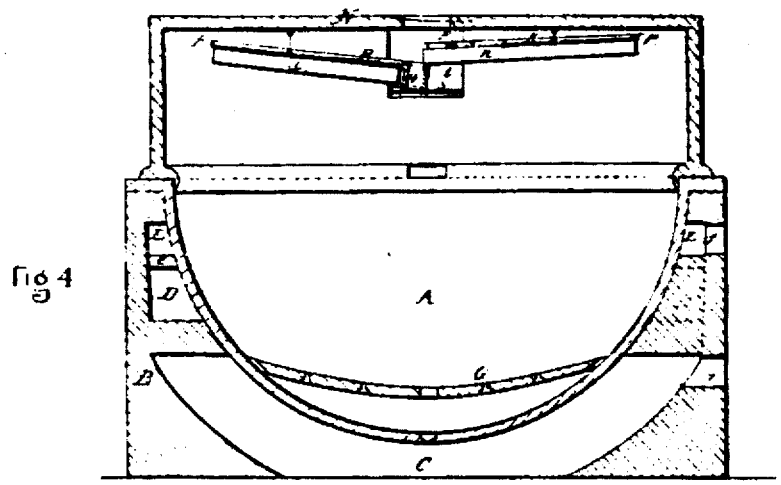
Figure 5:
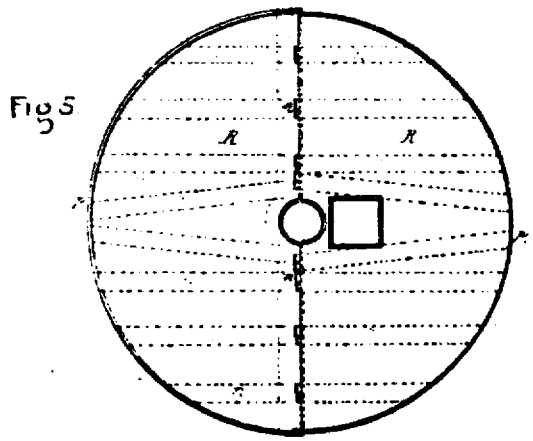

Figure 1 is a central vertical section of a melting-pan with my improvements applied. Fig. 2 is a horizontal section of the setting in the plane indicated by the line $x$ $x$ in Fig. 1. Fig. 3 is a vertical section in the plane indicated by the line $y$ $y$ in Fig. 1. Fig. 4 is a central vertical section of the pan and its cover and of the plates for collecting and discharging the condensed vapors in a plane at right angles to Fig. 1. Fig. 5 is a plan of the plates for collecting and discharging the condensed vapors.

Similar letters of reference indicate corresponding parts in the several figures.

One object of this invention is to enable the heat to be regulated or controlled under all parts of the bottom of a melting-pan which is heated by the direct action of fire. Another object is to prevent the burning of the fatty substances on the bottom of the pan; and a further and no less important object is to provide for the carrying off to a drain or sewer of the effluvia which arise from the fat in the melting process, and which render fat-melting establishments so great a nuisance in cities and other populous places. With a view to effect these desirable results a novel system of flues and dampers is provided under the pan to check, encourage, or regulate the draft of the fire at any and every point under its bottom. The pan is fitted with a close elevated cover, the only outlet from which, when the pan is in operation, is through a condenser to a drain or sewer; and it is also provided with a perforated false bottom, below which is a rotary stirrer, and in the upper part of the cover there are arranged suitable plates, gutters, or surfaces for the collection of any water or liquid that may result from the condensation of the steam or vapors eliminated from the fatty matters, and for conducting the said water or liquid to the before-mentioned outlet.

To enable others skilled in the art to make and use my invention, I will proceed to describe it with reference to the drawings.

A is the pan, having the fire-place C directly under its bottom, and having its sides surrounded by two circular horizontal split flues, D and E, one above another. The fire-place communicates with the lower flue, D, by means of a number of radial apertures, $a$ $a$, Figs. 1 and 2, which are fitted with sliding dampers $b$ $b$, operated by rods or handles $b'$, Fig. 1, protruding through the outside of the setting. B. The lower flue, D, is divided at $c$ and $d$, Fig. 2, and has free communication by openings $e$ $e$ with the flue E on opposite sides of the partition $c$. This partition also extends up through the flue E, so that the flame and heated gases of combustion from the fire-place entering the flue D through the apertures $a$ $a$ will pass, as shown by arrows in Fig. 2, toward the openings $e$ $e$, and through them into the upper flue, E, through which they pass in opposite directions to the two outlets, $f$ $f$, communicating with the chimney on opposite sides of a partition, $g$.

By closing some and opening others of the apertures $a$ $a$ by means of the sliding dampers $b$ $b$ the draft of the fire may be checked or encouraged under different parts of the pan, so that more lively combustion may be obtained in front, at the back, or on either side, or by partly closing all of the apertures $a$ $a$ in a greater or less degree the combustion may be regulated all around the pan. The heating of the contents of the pan is brought under perfect control.

When desired, the dampers $b$ $b$ may be all closed, and by opening another damper a direct draft may be had at $r$, Fig. 4, from the fire-place to the chimney.

G, Figs. 1 and 4, is the perforated false bottom, resting within the pan A at a short distance from the bottom proper. The object of this false bottom is to prevent any lumps, skin, or fibrous matters of the fat from coming into contact with the highly-heated bottom and thereby being burned. The perforations $h$ $h$ in the false bottom G permit the melted fat to drain through from the skin and fibrous matter.

H, Fig. 1, is the rotary stirrer, arranged within the space between the false bottom G and the bottom proper of the pan. This stirrer is secured firmly to an upright shaft, H, the lower end of which rests in a step-bearing in the center of the bottom of the pan, and by the rotary motion of which the stirrer is caused to constantly stir the melted fat in contact with the bottom of the pan and prevent it from being burned. Above the false bottom there is arranged a hollow upright shaft, I', through which the shaft H' of the lower stirrer, H, passes. This shaft I' is supported upon the false bottom G, and its upper part works in a bearing in the center of the cover N of the pan, and is thus not only itself kept upright, but keeps the shaft H' upright. To this shaft I' there is secured an arm, I, furnished with a series of upright bars or cutters, i i, which in their revolution with the shaft I', pass between a series of stationary upright bars or cutters, j j, secured within the pan, and so serve to cut up the lumps of fat which are placed in the pan and separate the skin and fibrous matters. The bars or cutters i i also operate as stirrers. Above the cover N the shaft I' is furnished with a bevel-gear, K, and the shaft H' with a bevel-gear, L, and these bevel-gears both gear with a bevel-gear, M, on a horizontal driving-shaft, M, from which the two shafts H' and I' are thus caused to receive rotary motion. The bevel-gears K and L should be capable of being uncoupled from their respective shafts, so that either of the said shafts should be capable of having its rotary motion suspended while the rotary motion of the other one is continued.

The cover N, which fits closely to and over the pan, may be of iron or of brick-work. It has a man-hole, k, Fig. 1, fitted with a door, k', which is only opened to admit a person to clean out the pan, and the only other outlet is at l, Figs. 1 and 4, where it has connected with it a descending trunk, P, Figs. 1 and 3, which is connected at the bottom with a box, Q, from which a pipe, connected at m, Fig. 3, leads to a drain or sewer. From and within this cover there are suspended two semicircular plates, R R, which fit loosely around the shaft I and extend nearly to the sides of the cover. These plates are furnished underneath with gutters n n for the collection of any water or liquid that may result from the condensation upon their under surfaces of steam or vapors eliminated from the melted fat in the pan. The said plates are also furnished with upwardly-projecting rims p p, to prevent the running back into the pan of any water or liquid that may be deposited by condensation upon their upper surfaces or drop thereon from the top of the cover N. The plate R' is furnished with a gutter, q, Fig. 4, into which its upper and lower surface and the gutters n n are drained, and the two plates R R' are so arranged that the upper and lower surfaces and gutters of R also drain into the gutter q, and that the latter gutter drains into a spout, s, leading through the outlet l, to discharge all the water or liquid of condensation through the trunk P into the box Q, and thence through m, Fig. 3, to the drain or sewer. The steam or vapor which escapes from the pan and cover through the outlet l into the trunk P is subject to the action of a shower of cold water from a sprinkler, S, arranged in the upper part of the said trunk, and supplied by a pipe, t, from the street-main or from any suitable reservoir, and thereby, for the most part, condensed in the trunk, what is not there condensed being subjected to the action of another shower from a sprinkler, S', arranged in the box Q, and supplied by a branch, t', from the pipe t, and thereby condensed. It will thus be seen that the trunk P and box Q constitute a condenser. The condensing water and the water or liquid resulting from the condensation of the escaping steam and noxious vapors all escape to the drain or sewer by the opening m. There being no escape from the cover of the pan but by this opening, no effluvia are permitted to escape to the atmosphere.

What I claim as my invention, and desire to secure by Letters Patent, is—

1. The radial openings a a, sliding dampers b b, and split horizontal circular flues D E, the whole arranged in relation with each other and with the fire-place and pan, substantially as herein described, for the purpose set forth.

2. The combination of the perforated false bottom G and the rotary stirrer, arranged between the said false bottom and the bottom proper of the pan, substantially as and for the purpose herein specified.

3. Providing a melting-pan with a cover, N, having an outlet to a drain or sewer but otherwise closed, substantially as herein described.

4. The employment, in combination with the cover, of a melting-pan having only an outlet to a drain or sewer, of a system of connecting-plates, R R', gutters, n n q, or other equivalent surfaces for the collection of condensed steam or other vapors eliminated from the melted fat contained in the said pan, and the conveyance of the same to the outlet of the cover, substantially as herein specified.

5. In combination with the cover of a melting-pan having only an outlet to a drain or sewer, a condenser arranged between the said outlet and the drain or sewer, substantially as and for the purpose herein set forth.

ANDREW BLACK

Witnesses:
HENRY T. BROWN,
J. W. COOMBS.